United States Patent Office 3,443,933
Patented May 13, 1969

3,443,933
METHOD OF PREPARING METAL BLACKS
Matthew B. Boyhan, Belton, Tex., and Peruvemba Swaminatha Venkatesan, Bronx, N.Y., assignors to Leesona Corporation, Warwick, R.I., a corporation of Massachusetts
No Drawing. Filed June 11, 1964, Ser. No. 374,272
Int. Cl. C22b *3/00, 11/04*
U.S. Cl. 75—108                    3 Claims

ABSTRACT OF THE DISCLOSURE

An improved method of preparing metal blacks is described. The method comprises precipitating the metal hydroxide from a salt solution of the metal by the addition of ammonium hydroxide and thereafter reducing the precipitated metal hydroxide to form the metal black. The metal blacks obtained have high catalytic activity, apparently as a result of the modified black surface.

---

This invention relates to an improved method of producing a noble metal black. More particularly, the invention relates to a method of producing metal blacks which have enhanced catalytic activity, possibly due to increased surface area. Basically, the method comprises forming the metal hydroxide and reducing the hydroxide with a suitable reducing agent to obtain the finely divided metal.

It has been long recognized that the family of platinum and palladium metals have excellent properties as catalysts in many gas-solid reactions. The use of such metals as a catalyst in the manufacture of sulphuric acid, ammonia, nitric acid, and in hydrogenation processes is known, as is the use of the metals as activators on electrode surfaces. Thus, electrodes catalyzed with one of the palladium or platinum metals are often employed in the construction of electrical cells where a reversible gas electrode is desired. Moreover, more recently the use of such materials as activators in fuel cell electrodes, i.e., cells wherein the energy of reaction between a fuel and an oxidant is converted directly into electrical energy, has received extended study.

Further, it is known that for good catalytic activity, the surface area of the catalyst exposed to the reactants should be as great as possible. For this reason, catalysts are formed by the decomposition of their compounds at comparatively low temperatures to obtain finely divided or spongy catalysts. Hydrosols or colloidal solutions are readily prepared by striking an arc between electrodes of the metals under water. Additionally, the more conventional metal blacks have been prepared by the electrolytic precipitation of the metal from a suitable salt solution. Thus, in the case of platinum, finely divided blacks are prepared by the electrolytic precipation of the metal from a chloroplatinate solution.

It has now been found that improved metal blacks can be prepared by first precipitating the metal hydroxide and thereafter reducing the hydroxide with a suitable reducing agent such as hydrogen or hydrazine. The blacks formed have enhanced catalytic activity, particularly when used on fuel cell electrodes, possibly due to an increase in the surface area.

Accordingly, it is an object of the present invention to provide an improved method of preparing metal blacks.

It is still a further object of the present invention to provide metal blacks having a large surface area by forming precipitated metal hydroxides of the metal and reducing the metal hydroxide by means of a reducing agent.

It is a further object of the present invention to provide platinum black by adding a solution of ammonium hydroxide to an aqueous solution of chloroplatinate to form the precipitated hydroxide, and thereafter reducing with aqueous hydrazine to form a finely divided metal black.

These and other objects of the invention will become more fully apparent from the following detailed description and illustrative examples.

In preparing the improved metal blacks according to the present invention, a salt solution of the metal is reacted with ammonium hydroxide to form the metal hydroxide. Thereafter, the metal hydroxide is reduced with a reducing agent such as hydrazine or bubbling hydrogen. The resultant metal is extremely finely divided and has a high degree of activity, particularly when employed as a catalyst on a fuel cell electrode.

The blacks of any of the metals of the fifth and sixth series of Group VIII of the Mendelejeff's Periodic Table, i.e., ruthenium, rhodium, palladium, osmium, iridium, and platinum, and the noble metals of Sub-Group I, i.e., gold and silver, can be prepared according to the present invention. For convenience, the metals will be referred to herein as the noble metals. However, although metal blacks of any of the above elements can be prepared according to the present invention, platinum black is preferred in view of its exceptional activity and stability, particularly when employed as a catalyst on a fuel cell electrode.

The metal hydroxides to be reduced can be prepared from an aqueous salt solution of the metal, such as solutions of the chloride, nitrate, or sulfate. For example, in the preparation of platinum black, ammonium hydroxide is added to an aqueous solution of chloroplatinic acid until the hydroxide is fully precipitated. The precipitate is then chemically reduced by a reducing agent. Any of the known reducing agents such as hydrazine or bubbling hydrogen can be employed in forming the metal black. However, it has been found that reduction with hydrazine is preferred, since a metal black with increased activity is obtained. The temperatures at which the hydroxides are formed and reduced are not critical, and can be varied over substantially wide ranges.

The metal blacks according to the invention can be used in any of the areas where conventional blacks have been employed.

Having described the invention in general terms, the following examples are set forth to illustrate preferred embodiments of the invention.

EXAMPLE I

A concentrated solution of ammonium hydroxide was added drop-wise to a 10% aqueous solution of $H_2PtCl_6$ until precipitation of the metal hydroxide is complete. The completion of the reaction is readily determined visually since the precipitate is yellow. A 50% aqueous solution of hydrazine is added with constant stirring, providing a platinum black which is finely divided and highly active. The black is washed with distilled water, filtered, and dried.

To demonstrate the utility of the novel black, a paste of the black is prepared with an aqueous dispersion of Teflon, where the Teflon particles have an average diameter of 0.3 micron. Thereafter, the paste is applied to a tantalum screen having a mesh size of 80 on the Tyler scale and dried by heating at 300° C. for 30 minutes.

A second electrode was made identical to that previously described except that the reduction of the metal hydroxide was carried out by bubbling hydrogen gas into the solution for one hour at 40° C., rather than adding hydrazine.

In order to demonstrate the superiority of the blacks prepared by the present invention over conventional blacks, similar metal support screens were coated with pastes using platinum blacks prepared by the electrolytic reduction of dissolved chloroplatinic acid, and by the reduction of chloroplatinic acid solution with bubbling hydrogen. The electrodes were tested in a $H_2$—$O_2$ fuel cell using 15 N $H_3PO_4$ at 75° C. as the electrolyte. The following data was obtained

| Current density (ma./cm.²) | Polarization (volts) | | | |
|---|---|---|---|---|
| | A | B | C | D |
| 25 | 0.118 | 0.170 | 0.220 | 0.210 |
| 100 | 0.228 | 0.283 | 0.440 | 0.350 |

A—hydroxide reduced with hydrazine. B—hydroxide reduced with hydrogen. C—$H_2PtCl_6$ reduced with hydrogen. D—$H_2PtCl_6$ electrolytically reduced.

As is apparent from the data of the table, the electrodes prepared according to the present invention had greatly improved electrochemical performance characteristics.

EXAMPLE II

A bi-porous platinum electrode having a coarse pore layer approximately 0.05″ thick and a fine pore layer approximately 0.01″ thick was prepared by pressing platinum particles having a mesh size of minus 200 to plus 325 at 1½ TSI on the Tyler scale. The pressed plate was sintered at 1300° C. for one hour in an argon atmosphere. Density after pressing was 54%. Density after sintering was 56.2%. A fine pore layer was prepared by pressing platinum powders having a mesh size of minus 400 onto the coarse pore layer employing hand-pressure only. The structure was sintered at 1100° C. for 45 minutes in an argon atmosphere. The structure had an air permeability of 140 milliliters per minute per square centimeter. At ΔP of 3.2 inches of water, the bubble pressure was 3.2 p.s.i.

Platinum hydroxide prepared as described in Example I was sucked into the pores of the bi-porous electrode by means of a vacuum pump. Thereafter, hydrazine was sucked into the pores to reduce the metal hydroxide. After treatment, the air permeability of the electrode was 40 milliliters per minute per square centimeter at a ΔP of 3.2 inches $H_2O$ indicating that the pores were filled with catalyst. The structure had excellent electrochemical performance characteristics.

In the aforesaid examples, the platinum can be replaced by other metals such as silver, gold, ruthenium, osmium, iridium, palladium, and rhodium to prepare the corresponding metal blacks. Moreover, other metal salts can be employed in the preparation of the metal hydroxide. It should be appreciated that the invention is not to be limited by the examples as it is possible to produce still other embodiments without departing from the inventive concept herein disclosed and covered by the appended claims.

What is claimed is:

1. The method of preparing a metal black of the 5th and 6th series of Group VIII of the Mendeleeve Periodic Table comprising the steps of forming a solution of the metal salt, forming a precipitate of the metal by adding ammonium hydroxide to the salt solution and reducing said precipitated metal hydroxide with a member of the group consisting of hydrazine and bubbling hydrogen to form a metal black.

2. The method of forming finely divided platinum black comprising adding ammonium hydroxide to a platinum salt to form a precipitate of platinum hydroxide and reducing said precipitate with a member of the group consisting of hydrazine and bubbling hydrogen.

3. The method of claim 2 wherein the platinum salt is a chloroplatinate solution and the reducing agent is an aqueous solution of hydrazine.

References Cited

UNITED STATES PATENTS

| 2,254,976 | 9/1941 | Powell | 75—108 |
| 2,375,506 | 5/1945 | Turck | 75—108 |
| 2,726,151 | 12/1955 | Kern | 75—108 |
| 2,787,540 | 4/1957 | Appell | 75—108 |
| 2,863,762 | 12/1958 | Pullen | 75—108 |
| 2,970,051 | 1/1961 | Mackiw et al. | 75—108 |

OTHER REFERENCES

Jacobson, Encyclopedia of Chemical Reactions, vol. V, 1953, p. 447.

RICHARD O. DEAN, *Primary Examiner.*

U.S. Cl. X.R.

75—.5, 118, 121